US012758997B2

(12) United States Patent
Li et al.

(10) Patent No.: US 12,758,997 B2
(45) Date of Patent: Oct. 13, 2026

(54) AIRLESS SPRAY NOZZLE ASSEMBLY

(71) Applicant: QUA TECH LIMITED, Shanghai (CN)

(72) Inventors: Bijun Li, Shanghai (CN); Qinghua Li, Wuxi (CN)

(73) Assignee: Qua Tech Limited

( * ) Notice: Subject to any disclaimer, the term of this patent is extended or adjusted under 35 U.S.C. 154(b) by 341 days.

(21) Appl. No.: 18/199,869

(22) Filed: May 19, 2023

(65) Prior Publication Data

US 2023/0321675 A1 Oct. 12, 2023

Related U.S. Application Data

(63) Continuation-in-part of application No. 17/396,969, filed on Aug. 9, 2021, now abandoned, which is a continuation-in-part of application No. 16/279,653, filed on Feb. 19, 2019, now Pat. No. 11,110,478.

(51) Int. Cl.
*B05B 9/01* (2006.01)
*B05B 12/00* (2018.01)
*B05B 15/16* (2018.01)

(52) U.S. Cl.
CPC .............. *B05B 9/01* (2013.01); *B05B 12/002* (2013.01); *B05B 15/16* (2018.02)

(58) Field of Classification Search
CPC . B05B 15/534; B05B 15/65–68; B05B 15/16; B05B 1/18; B05B 1/02; B05B 7/02; B05B 9/01
USPC .......................................... 239/390–397, 600
See application file for complete search history.

(56) References Cited

U.S. PATENT DOCUMENTS

| | | | | | |
|---|---|---|---|---|---|
| 4,165,836 | A * | 8/1979 | Eull | B05B 15/00 | 239/119 |
| 4,483,481 | A * | 11/1984 | Calder | B05B 1/00 | 239/119 |
| 4,611,758 | A * | 9/1986 | Geberth, Jr. | B05B 15/534 | 239/119 |
| 4,635,850 | A * | 1/1987 | Leisi | B05B 1/326 | 285/273 |
| 5,340,029 | A * | 8/1994 | Adams | B05B 15/534 | 239/119 |

* cited by examiner

*Primary Examiner* — Cody J Lieuwen

(57) ABSTRACT

An airless spraying equipment includes a spray tip guard, a spray tip configured to be inserted into the spray tip guard perpendicularly to the axis of the spray tip guard, a pre-atomizing component, and a tip atomizing component. The pre-atomizing component and the tip atomizing component are connected to each other sequentially along the channel axis, in a fluid stream direction. The pre-atomizing component further includes a feeding channel, a pre-atomization channel, and at least two pre-atomization regulating channels. The feeding channel, the pre-atomization channel, and the at least two pre-atomization regulating channel are coaxial hollow channels sequentially defined and connected along the channel axis inside the pre-atomizing component.

7 Claims, 15 Drawing Sheets

AIRLESS SPRAY NOZZLE ASSEMBLY

CROSS-REFERENCE TO RELATED APPLICATIONS

This application is a continuation in part application of U.S. patent application Ser. No. 17/396,969, which was filed on Aug. 9, 2021 and which claims the benefit of U.S. patent application Ser. No. 16/279,653, which was filed on Feb. 19, 2019 and which claims the benefit of Chinese Patent Application 201810418572.X, filed May 4, 2018. The entire disclosures of the applications referenced above are incorporated by reference.

FIELD

The present disclosure generally relates to spaying equipment, and more particularly to high-pressure and low-pressure airless spray nozzle assemblies.

BACKGROUND

A variety of techniques are currently available for airless spray nozzle assemblies. Because airless sprayers have the characteristics of light weights and stable output pressures, the sprayers have been widely used in home finishing, building and road constructions, dock constructions and other industries. The demand is increasing both at home and abroad. The airless sprayers spray various fluid by output atomization through the spray tip. The key components for achieving atomized output are a spray tip and a saddle-shaped seal ring, which are usually sold an accessory assembly.

The spray tip needs to be closely fitted to the saddle-shaped sealing ring and fixed in a spray tip guard, which is coupled with a spray gun frame via nuts to facilitate atomized spraying.

Traditionally, the spray tip and the seal ring are precisely fitted to form a metal-to-metal hard seal, the required dimensions of the saddle-shaped semi-cylinder metal surface have to be very accurate, and the surfaces of the spray tip and the seal ring can only be seamlessly fitted by precision machining. Such process is very costly, inefficient and unreliable, which directly affects effectiveness of the atomization and normal use of the airless spray tip. Further, the airless spray tip needs to be reversed for internal cleanse between uses by turning the spray tip 180 degrees to a clean position. Thus, the spray tip and the saddle-shaped seal undergo certain amount of torque and friction, which causes the fitted surfaces to be scratched, resulting in a matching gap, and causing drips or splashes to occur during use.

Additionally, the sprayed pattern may have nonuniform diffusion due to different fluid pressure at the inlet of the passage and the fluid pressure loss at the outlet of the passage.

Thus, an airless nozzle with better sealing properties having a longer service life and a spray tip having an improved internal flow channel structure for a large range pressure fluid sprayer to produce a uniformity of the spray pattern is desired. As disclosed below, significantly improves upon the state-of-the-art, solves the above problems effectively, and enables functions that could not have been successfully performed before.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An airless spray nozzle includes a spray tip guard, a spray tip configured to be inserted into the spray tip guard perpendicularly to the axis of the spray tip guard, and a saddle seal assembly configured to be inserted into the spray tip guard along the axis of the spray tip guard. The saddle seal assembly includes a metal sealing sleeve and a cylindrical elastic seal. The metal sealing sleeve includes a first saddle-shaped semi-cylinder surface closely matching with an outer surface of the spray tip to form an outer hard sealing structure. The cylindrical elastic seal includes a second saddle-shaped semi-cylinder surface closely matching with the outer surface of the spray tip to form an inner flexible sealing structure. A first end portion of the cylindrical elastic seal is configured to be inserted into the metal sealing sleeve. The first saddle-shaped semi-cylinder surface and the second saddle-shaped semi-cylinder surface are configured to be spliced to form a continuous saddle-shaped semi-cylinder surface in order to seal a stepped inlet hole of the airless spray nozzle.

The saddle seal assembly may further include a metal sleeve insert attached to the inner surface of the cylindrical elastic seal to provide harder and durable inner surface to extend the service life. Additionally, the cylindrical elastic seal may further include bevels angled on its contacting surface to reduce friction between the contacting surfaces to further extend the service life of the assembly.

An airless spraying equipment includes a spray tip guard, a spray tip configured to be inserted into the spray tip guard perpendicularly to the axis of the spray tip guard, a handle arranged on one end of the spray tip, a bevel arranged on the other end of the spray tip, a retaining shoulder, a ring collar, a mounting hole having a channel axis, a pre-atomizing component, and a tip atomizing component. The pre-atomizing component and the tip atomizing component are connected to each other sequentially along the channel axis, in a fluid stream direction. The pre-atomizing component further includes a feeding channel, a pre-atomization channel, and at least two pre-atomization regulating channels. Further, the feeding channel, the pre-atomization channel, and the at least two pre-atomization regulating channel are coaxial hollow channels sequentially defined and connected along the channel axis inside the pre-atomizing component. A saddle seal assembly is configured to be inserted into the spray tip guard along the axis of the spray tip guard. The saddle seal assembly includes a metal sealing sleeve having a first saddle-shaped semi-cylinder surface closely matching with an outer surface of the spray tip to form an outer hard sealing structure, a cylindrical elastic seal having a second saddle-shaped semi-cylinder surface closely matching with the outer surface of the spray tip to form an inner flexible sealing structure, and a metal sleeve insert includes a hollow cylinder shape that matches the inner surface of the cylindrical elastic seal. In addition, a first end portion of the cylindrical elastic seal is configured to be inserted into the metal sealing sleeve. The first saddle-shaped semi-cylinder surface and the second saddle-shaped semi-cylinder surface are configured to be spliced to form a continuous saddle-shaped semi-cylinder surface, to thereby seal a stepped inlet hole of the high-pressure airless spray nozzle. The metal sleeve insert is attached onto the inner surface of the cylindrical elastic seal.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The present disclosure describes an airless spray nozzle assembly that has the following enhanced outcomes: for example, 1) greatly increases the production efficiency and reduces production costs for saddle seal assembly by combining a soft sealing structure with a hard sealing structure; 2) improves sealing effect and extends the seal's service life; 3) lowers the requirement for manufacturing measurement precision; 4) allows more convenient operation without a tool; and 5) produces a uniform spraying pattern and eliminates streaks of spraying fluid deposits formed at or near the edges of the sprayed area. As such, the spraying fluid can be uniformly applied to the surface of the workpiece, with no obvious fringe, therefore greatly improves the coating quality.

The internal structure of a traditional typical spray tip flow channel includes two parts, a first part being a spraying fluid feed channel and a second part being a spraying fluid atomizing component. The inside of the spraying fluid feed channel is a general circular through hole, which serves to guide the flow of the spraying fluid. The spraying fluid is transmitted to the chamber of the spraying fluid atomizing component, then enters an outlet passage of the spraying fluid atomizing component, and finally passes through a tip outlet orifice with a wedge-shaped cut to produce an atomized spray.

Figure 13A:
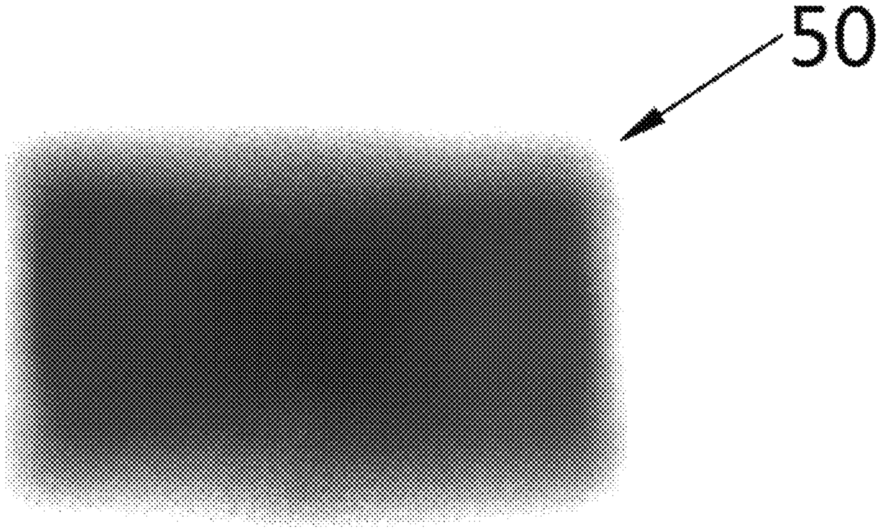
FIG. 13A is a diagram showing a spray pattern using example spraying equipment according to the principles of the present disclosure.
Figure 13B:
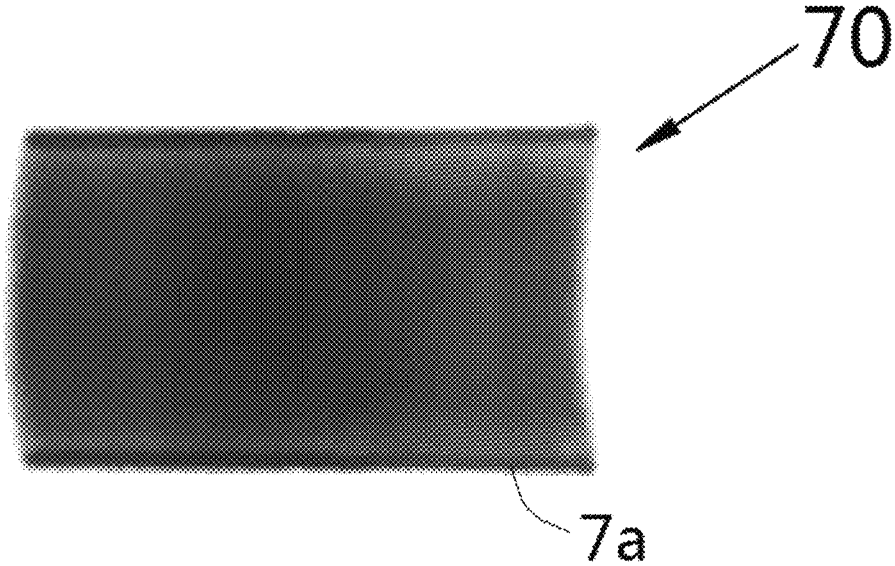
FIG. 13B is a diagram showing a spray pattern using a prior art pressure spraying equipment.

Since this structure does not produce spray fluid turbulence in the spraying fluid feed channel, the net pressure loss of the spraying fluid at the outlet orifice is significant. In other words, the output pressure at the outlet orifice and the input pressure at the inlet of the spraying fluid feed channel are quite different. The spraying pressure cannot produce uniform atomization, causing more spray fluid deposited at or near the edge of a spray pattern. This results in streaks on the edges of the pattern, and the distribution of the paint is uneven, as shown in FIG. 13B. Therefore, the spraying fluid cannot be uniformly applied to a surface of a workpiece during the spraying operation, and the formation of the obvious streaks directly impacts the coating effectiveness.

The problem of non-uniformity of the spray pattern (especially under low pressure conditions) can be solved by changing the internal flow channel structure of the spray tip.

Various embodiments and examples are disclosed in the present disclosure to illustration the solution.

Figure 1:
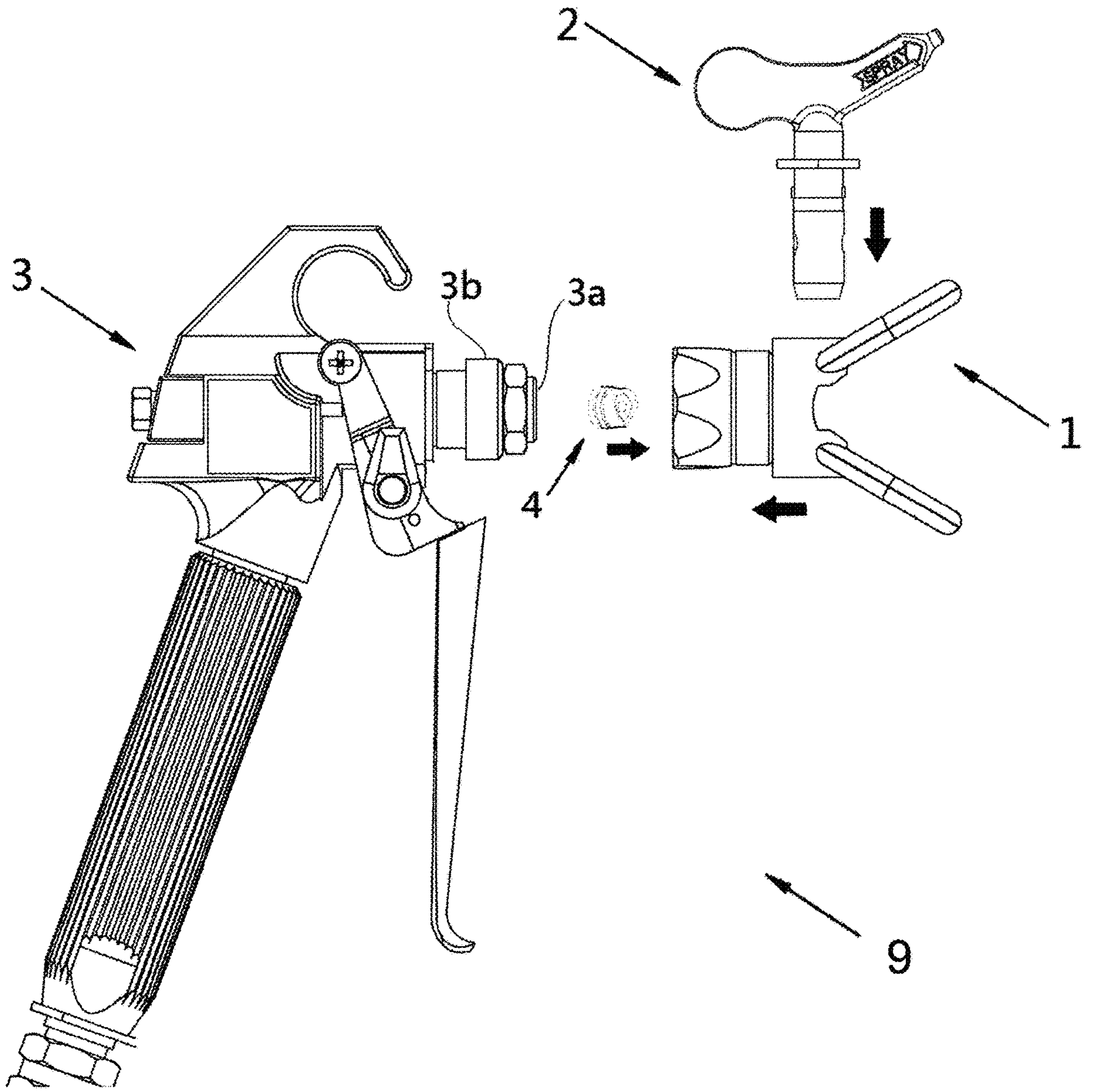
FIG. 1 is an exploded perspective view of an example spaying equipment including an airless nozzle having a spray tip guard, a spray tip, a spray gun, and a saddle seal assembly according to the principles of the present disclosure.

As shown in FIG. 1, the example spaying equipment 9 including the airless nozzle 10 having a spray tip guard 1, a spray tip 2, and a saddle seal assembly 4. The airless nozzle 10 is used in the spray gun 3. The spray tip 2 is vertically inserted into the spray tip guard 1. The axis of the spray tip 2 is perpendicular to the axis of the spray tip guard 1. The saddle seal assembly 4 is inserted into the spray tip guard 1. The axis of the saddle seal assembly 4 is along the axis of the spray tip guard 1. The saddle seal assembly 4 is formed by a cylindrical elastic seal 6 and a metal sealing sleeve 5 (also shown in FIGS. 5 and 6). The spray gun 3 includes a connection tube 3*b* with a connection end 3*a*. The spray tip guard 1 is screwed onto the spray gun connection tube 3*b* via the connection end 3*a*.

Figure 2:
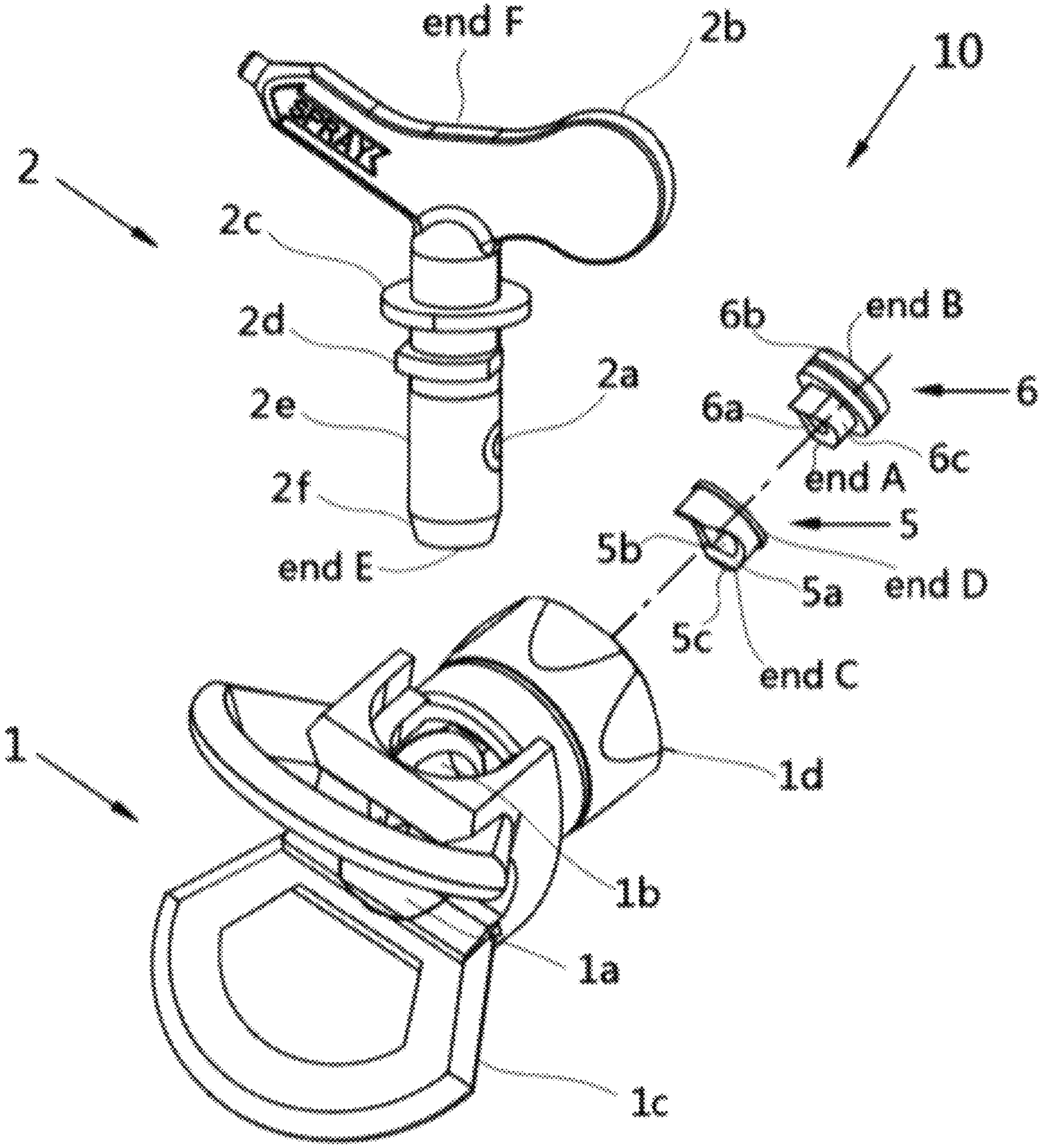
FIG. 2 is another exploded perspective view of the spray tip guard, the spray tip, the saddle seal assembly and the spray tip guard of the example airless nozzle of FIG. 1.

Specifically, FIGS. 2 and 3 illustrate that the spray tip guard 1 includes a coupling/mounting nut 1*d*, a wear-resistant inner sleeve 8, and one or more diverging tip guard members 1*c*. Each of the one or more diverging tip guard members 1*c* has a U-shaped structure.

The one or more diverging tip guard members 1*c* are configured to support the spray tip 2 and keep the spray tip 2 from touching the ground. The one or more diverging tip guard members can also serve as carrying handles when the spray tip 2 is not in use. The one or more diverging tip guard members 1*c* are configured to be connected to the outside of the wear-resistant inner sleeve 8.

Additionally, a horizontal hole 1*a* is opened/defined in an axial direction of the spray tip guard 1. One end of the horizontal hole 1*a* is an inlet, and the other end is an outlet. A vertical hole 1*b*, which joins with the horizontal hole 1*a*, is opened/defined in a radial direction of the spray tip guard 1.

Figure 4:
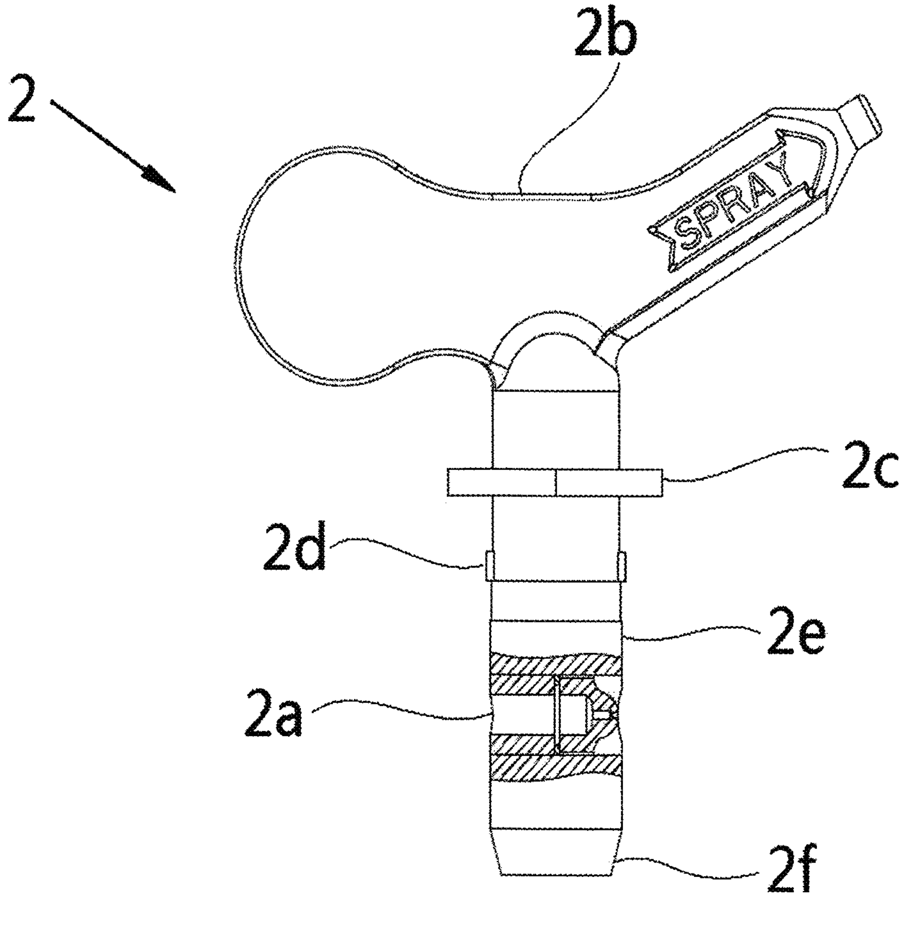
FIG. 4 is a perspective view of the spray tip of FIG. 1, with partial sectional view showing a stepped inlet hold of the spray tip.

As shown in FIG. 4, end E of the spray tip 2 is adapted to be inserted into and tightly fitted to the vertical hole 1*b* and blocks the horizontal hole 1*a*. The spray tip 2 is adapted to be inserted into a connection hole defined within the wear-resistant inner sleeve 8 through the vertical hole 1*b*. A stepped inlet hole 2*a* is opened/defined in the spray tip 2 near end E.

The metal sealing sleeve 5 is disposed inside the horizontal hole 1*a* and located close to the inlet end of the horizontal hole 1*a*. The metal sealing sleeve 5 further includes a saddle-shaped semi-cylinder surface 5*a* on the side close to the spray tip 2 and configured to match/fit with the outer surface of the spray tip 2 with end C of the metal sealing sleeve 5. The airless nozzle 10 further includes the cylindrical elastic seal 6 configured to be inserted into the metal sealing sleeve 5 with end A of the cylindrical elastic seal 6, extended beyond the saddle-shaped semi-cylinder surface 5*a*, having a saddle-shaped semi-cylinder surface 6*a* match/fit with the outer surface of the spray tip 2. When the saddle-shaped semi-cylinder surface 6*a* seals one end of the stepped inlet hole 2*a*, the saddle-shaped semi-cylinder surface 5*a* and the saddle-shaped semi-cylinder surface 6*a* are spliced (combined) to form a continuous saddle-shaped semi-cylinder surface, which seals the stepped inlet hole 2*a*. In other words, the saddle-shaped semi-circular surface 5*a* serves as a preliminary seal, and the saddle-shaped semi-cylinder surface 6*a* serves as a complemental seal to further prevent leakage.

The airless nozzle design according to the present disclosure greatly improves parts production efficiency and reduces the production cost by combining a flexible sealing structure and a hard sealing structure. The saddle-shaped semi-cylinder surface 5*a* closely matching/fitting with the outer surface of the spray tip 2 forms an outer hard sealing structure. The saddle-shaped semi-cylinder surface 6*a* closely matching/fitting with the outer surface of the spray tip 2 forms an inner flexible sealing structure.

Specifically, the connection hole of the wear-resistant inner sleeve 8 is hard sealed with the spray tip 2. When the spray tip guard 1 is screwed onto the connecting tube 3*b* of the spray gun 3 by the mounting nut 1*d*, the connecting end 3*a* of the spray gun 3 pushes back the saddle seal assembly 4 into close contact with the spray tip 2. The preliminary seal provided by the saddle-shaped semi-circular surface 5*a* is a hard seal while the seal between the saddle-shaped semi-cylinder surface 6*a* and the spray tip 2 is a soft seal.

In addition, the outer surface of the metal sealing sleeve 5 is in close contact with the inner surface of the horizontal hole 1*a*. When the wear-resistant inner sleeve 8 is used, the metal sealing sleeve 5 is placed inside the wear-resistant inner sleeve 8 and is hard sealed with the inner surface of the wear-resistant inner sleeve 8.

During the mounting process, the cylindrical elastic seal 6 is pressed by the connecting end face 3*a*. Since the cylindrical elastic seal 6 has a tendency to move toward the spray tip 2, the saddle-shaped semi-cylinder surface 6*a* can maintain a close contact with the outer surface of the spray tip 2 to achieve a good seal.

The spray tip 2 may include a cylinder-shaped structure, which has a bevel 2*f* on one end and a handle 2*b* on the other end. The cylinder-shaped structure further includes a retaining shoulder 2*d* and a tip ring collar 2*c* located close to the end connecting with the handle 2*b*. The spray tip 2 needs to be rotated 180 degrees to be cleansed. The tip ring collar 2*c* interferes with the frontend surface of the diverging tip guard members 1*c* during the rotation of the spray tip 2 to thereby limit the rotation range of the spray tip 2. As such, the step inlet hole 2*a* turns to the front of the spray tip guard to be at the outlet position. The tip ring collar 2*c* is designed to increase grip to make mounting and rotating spray tip 2 easier.

The spray tip 2 often needs to be rotated for being cleansed. The rotating torque causes wearing off the surface of the spray tip 2 and the saddle-shaped semi-cylinder surface 6*a*. The cylindrical elastic seal 6 can compensate to the sealing surface because of its elasticity even after the contacting surfaces are worn off. As such, the sealing effect is maintained and the service life of the seal is extended.

The sealing structure mainly relies on the deformation of the cylindrical elastic seal 6 to form a close fit with the surface of the spray tip 2's stepped inlet hole 2*a*. Accordingly, the required dimensional precision of the manufacturing process is greatly reduced to thereby greatly improve parts production efficiency and reduce the production cost.

Because the cylindrical elastic seal 6 has some deformation elasticity, the spray tip guard seal 1 can be hand-fastened by a user without the help of a tool (e.g., a wrench, etc.).

Additionally, and/or alternatively, a ring collar 6*b* is disposed on the cylindrical elastic seal 6 at end B. The ring collar 6*b* abuts against the end D of the metal sealing sleeve 5. End B of the cylindrical elastic seal 6 is away from where the cylindrical elastic seal 6 is inserted into the metal sealing sleeve 5. End D of the metal sealing sleeve 5 is away from the saddle-shaped semicircular surface 5*a*. The purpose of the ring collar 6*b* is to prevent the metal sealing sleeve 5 from coming off cylindrical elastic seal 6, thereby improving the assembly structural strength and stability.

The cylindrical elastic seal 6 with a circumferential positioning structure further includes an inner coupling plane 6*c* configured to be disposed between the metal sealing sleeve 5 and the cylindrical elastic seal 6. One end of the inner coupling plane 6*c* is adapted to be inserted into the metal sealing sleeve 5.

The purpose of the inner coupling plane 6*c* is to prevent the metal sealing sleeve 5 from rotating relative to the cylindrical elastic seal 6 and to avoid a gap between the saddle-shaped semi-cylinder surface 6*a* and the outer surface of the spray tip 2.

The cylindrical elastic seal 6 is nestled inside the metal sealing sleeve 5 to form the saddle seal assembly 4 by fitting the inner surface of the metal sealing sleeve 5 with the outer surface of the cylindrical elastic seal 6. The outer surface of the saddle seal assembly 4 is fitted with the inner surface of the horizontal hole 1*a* (i.e., the outer surface of the metal sealing sleeve 5 is fitted with the inner surface of the horizontal hole 1*a* and the ring collar 6*b* is fitted with the inner surface of the horizontal hole 1*a*).

The overall tight sealing structure effectively prevents dripping and splashing in actual use.

The metal sealing sleeve 5 with a circumferential positioning structure further includes at least one outer coupling plane 5*b* disposed on the inner surface of the metal sealing sleeve 5. The inner coupling plane 6*c* is fitted with the outer coupling plane 5*b* and is disposed at end A of the cylindrical elastic seal 6. End A of the cylindrical elastic seal 6 is adapted to be inserted into the metal sealing sleeve 5. The circumferential positioning structure prevents circumferential rotation and makes installation easier.

Additionally, and/or alternatively, two inner fitting planes 6*c* may be symmetrically arranged and two outer fitting planes 5*b* may be symmetrically arranged. The two inner fitting planes 6*c* and the two outer fitting planes 5*b* are configured to be matched each other respectively.

Alternatively, the circumferential positioning structure may include other shapes. For example, a non-circular hole may be defined inside the metal sealing sleeve 5, and the end portion of the cylindrical elastic seal 6 configured to be inserted into the metal sealing sleeve 5 may be shaped to match/fit the non-circular hole.

Additionally, the circumferential positioning structure further includes a retaining step 7 disposed at the end of the horizontal hole 1*a* closer to the inlet, and a positioning surface 5*c* disposed at the end C of the metal sealing sleeve 5. The positioning surface 5*c* abuts against the retaining step 7. As such, the metal sealing sleeve 5 is prevented from moving too close to the spray tip 2, thereby avoiding excessive wear between the metal sealing sleeve 5 and the spray tip 2. The sealing between the metal sealing sleeve 5 and the spray tip 2 is thus maintained, and the service life of the overall structure is extended.

The design of including the positioning surface 5*c* further strengthens and avoids radial deformation of the structure of the airless spray nozzle assembly.

The circumferential positioning structure prevents the metal sealing sleeve 5 from moving excessively close to the spray tip 2, and thus reduces the wear caused by excessive contact between the metal sealing sleeve 5 and the spray tip 2.

Figure 5:
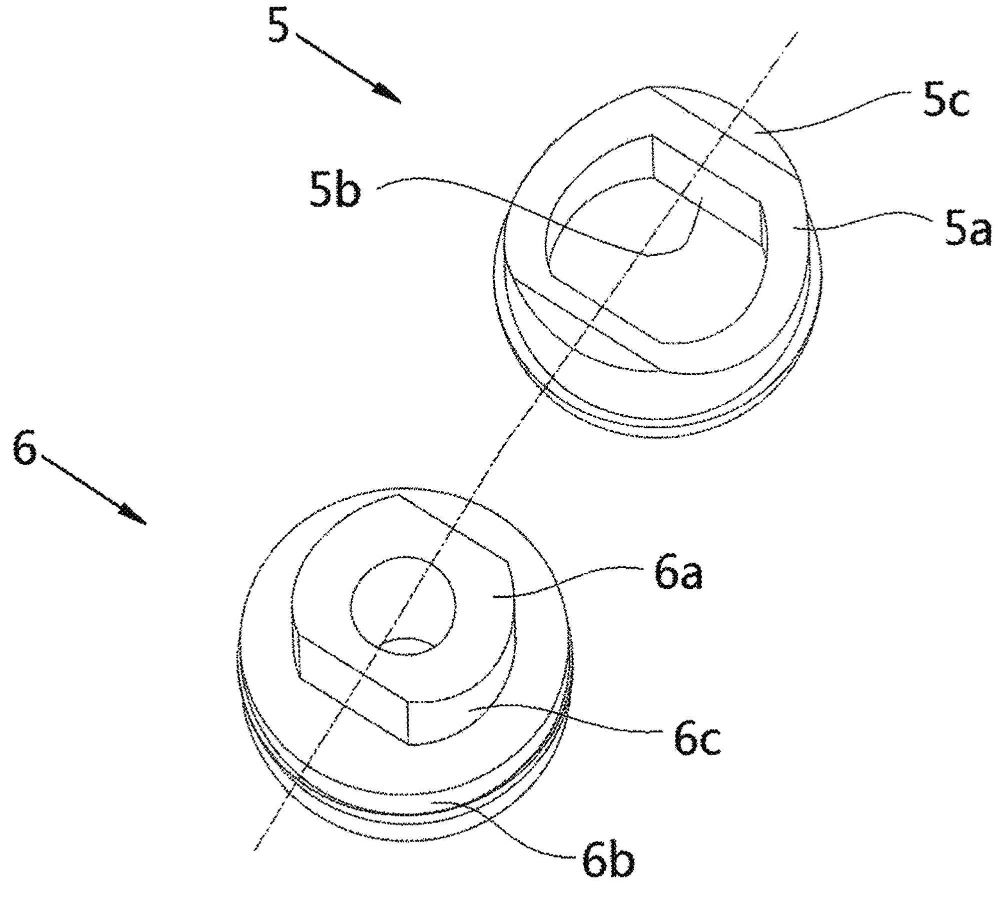
FIG. 5 is a perspective view of the saddle seal assembly of FIG. 1 when the cylindrical elastic seal is separated from the metal sealing sleeve.
Figure 6:
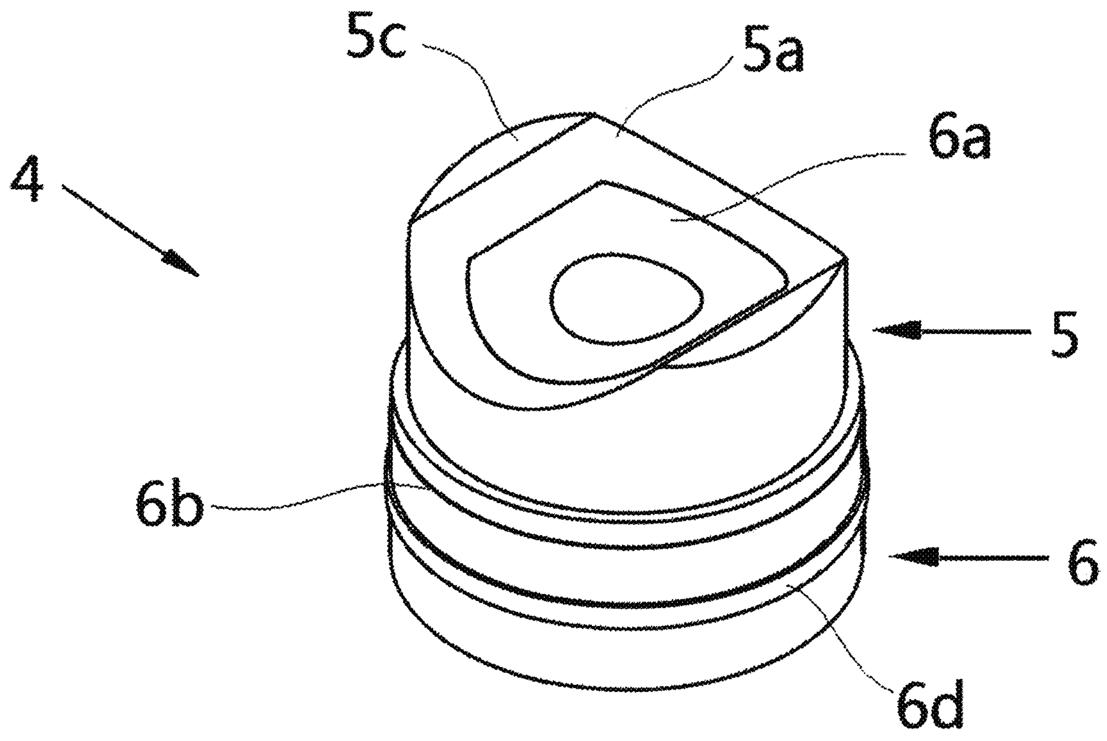
FIG. 6 is a perspective view of the saddle seal assembly of FIG. 1 when the cylindrical elastic seal is inserted into the metal sealing sleeve.

FIG. 5 shows the saddle seal assembly 4 when the cylindrical elastic seal 6 is separated from the metal sealing sleeve 5, and FIG. 6 shows the saddle seal assembly 4 when the cylindrical elastic seal 6 is inserted into the metal sealing sleeve 5.

As shown in FIG. 5, the outer diameter of the positioning surface 5*c* is smaller than or equal to the outer diameter of the ring collar 6*b*. The cylindrical elastic seal 6 further includes a groove around the ring collar 6*b*, in which an O-ring 6*d* is embedded. The O-ring 6*d* is replaceable. The sealing effect of the cylindrical elastic seal 6 maintains the sealing effect by replacing the O-ring after being worn out.

The cylindrical elastic seal 6 can be made of, for example, nylon, or rubber, or any other elastic materials etc.

The above configuration reduces the wear caused by contacts between the metal sealing sleeve 5 and the inner surface of the horizontal hole 1*a*, thereby helping the soft sealing structure of the cylindrical elastic seal 6 to be more effective.

Figure 3A:
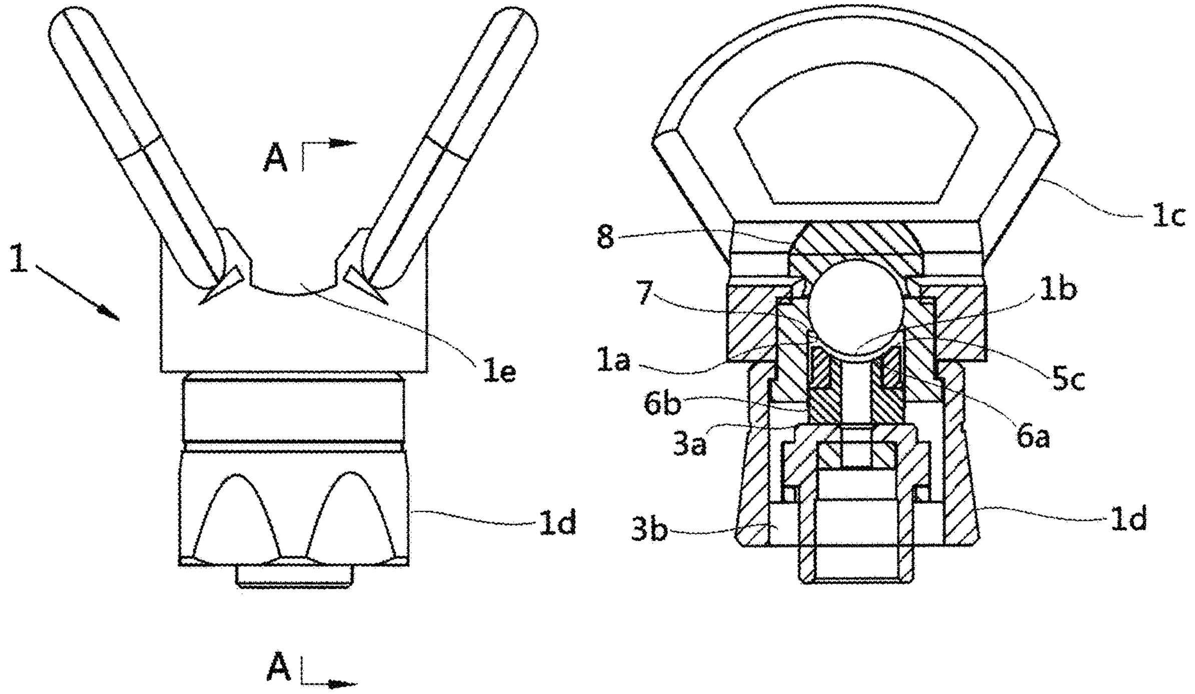
FIGS. 3A and 3B are cross-sectional views of the spray tip guard of FIG. 1 from two different cutting planes, having a spray connection gun end and a spray gun connection tube inserted into the spray tip guard.
Figure 3B:
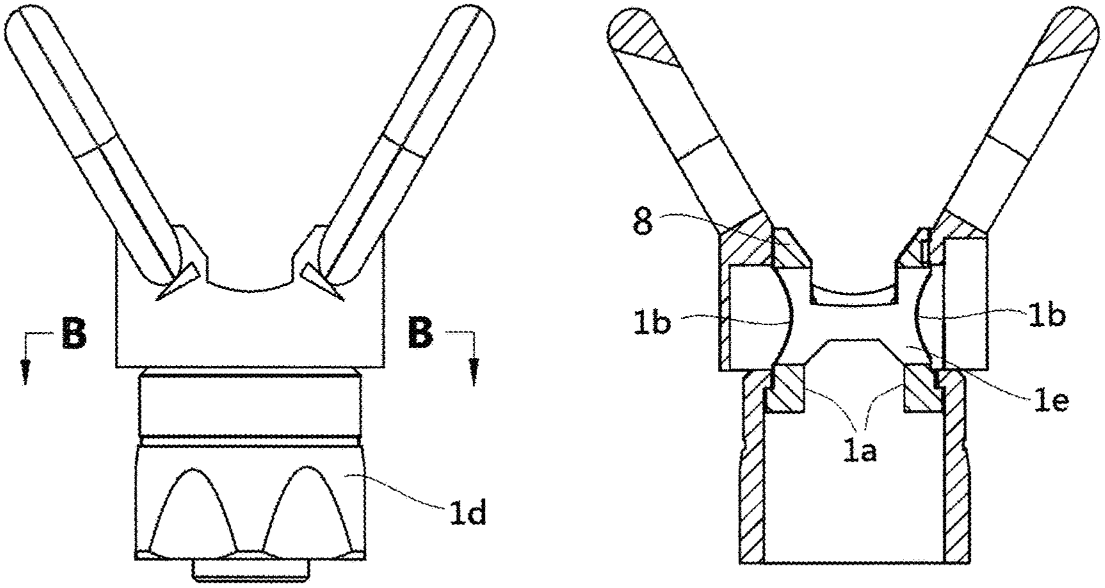

Further, FIG. 3A shows that the horizontal hole 1*a* is sleeved with a wear-resistant inner sleeve 8. FIG. 3B shows that the wear-resistant inner sleeve 8 has an open hole 1*e* matching the vertical hole 1*b* so that the spray tip 2 can be inserted into the vertical hole 1*b* through the open hole 1*e* and fitted with the inner surface of the vertical hole 1*b*. The wear-resistant inner sleeve 8 can be made of a metal material.

The wear-resistant inner sleeve 8 prevents sealing from deterioration caused by the wear between the spray tip 2 and the wear-resistant inner sleeve 8, thereby extending its service life.

FIG. 3A further shows that one end of the wear-resistant inner sleeve 8 is flush with the outlet end of the horizontal hole 1*a*, and the other end of the wear-resistant inner sleeve 8 protrudes out of the inlet end opening of the horizontal hole 1*a*. A mounting nut 1*d* is releasably mounted on the protruding end of the wear-resistant inner sleeve 8. The mounting nut can be, for example, fastened on a connection tube 3*b* with threads. The threaded connection tube 3*b* can abut against end B of the cylindrical elastic seal 6. The connection tube 3*b* squeezes the cylindrical elastic seal 6 in the axial direction so that the saddle-shaped semi-circular surface 5*a* and the saddle-shaped semi-cylinder surface 6*a* are spliced (combined) to form a saddle-shaped semi-circular surface. Since the cylindrical elastic seal 6 is squeezed by the connection tube 3*b*, the saddle-shaped semi-cylinder surface 6*a* and the spray tip 2 are in close contact to achieve a good sealing effect. The cylindrical elastic seal 6 may be made of nylon, rubber, or other elastic materials.

The production efficiency of the airless spray nozzle assembly disclosed herein is greatly increased and the production costs of which is greatly reduced by combining a soft sealing structure and a hard sealing structure.

Because the elastic sealing design requires lower machining precision of the cylindrical elastic seal 6, the cylindrical elastic seal 6 may be injection molded in its entirety. As such, the manufacturing process has much higher production capacity and much lower processing costs than that of a mechanical machining process.

Figure 7B:
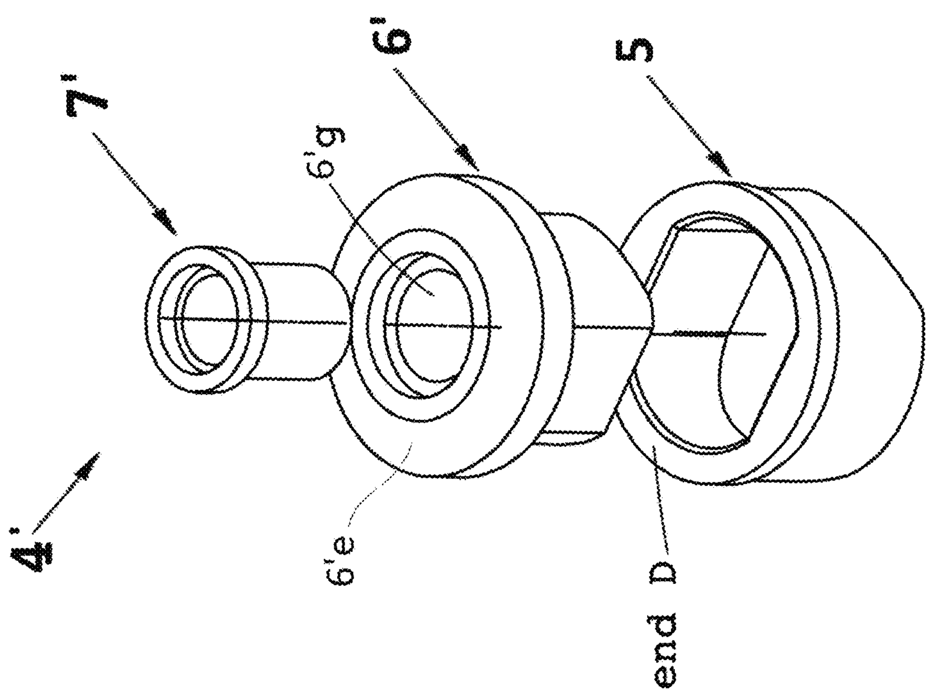
FIGS. 7A and 7B are exploded views of another example saddle seal assembly including another example metal sealing sleeve, a cylindrical elastic seal, and a metal sleeve insert.
Figure 7A:
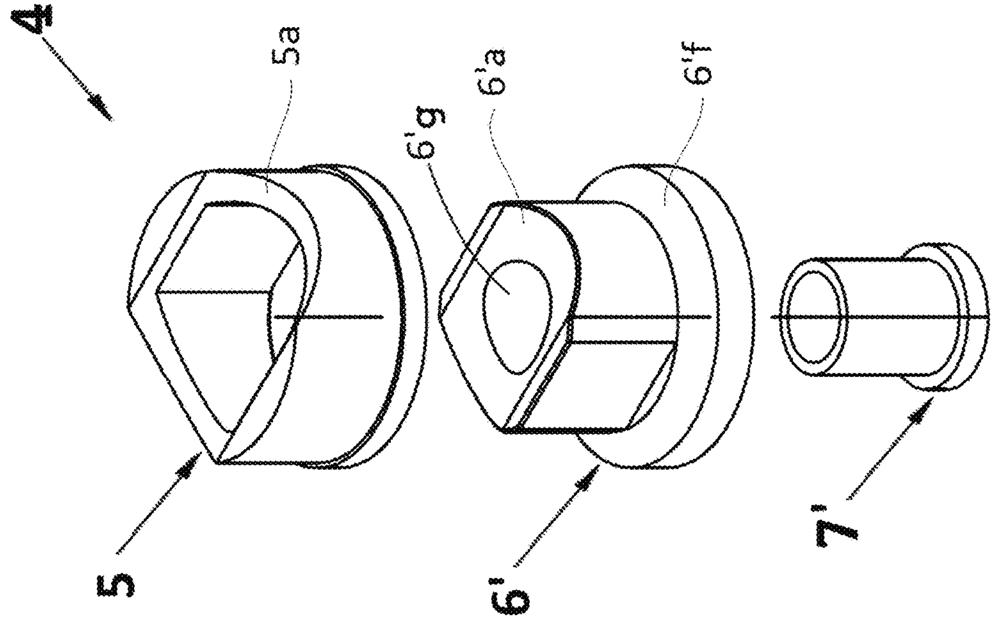

FIGS. 7A and 7B illustrate another saddle seal assembly 4' including another example metal sealing sleeve 5, a cylindrical elastic seal 6', and a metal sleeve insert 7'. Similar to the saddle seal assembly 4, the saddle-shaped semi-cylinder surface 5*a* and the saddle-shaped semi-cylinder surface 6'*a* are spliced (combined) to form a continuous saddle-shaped semi-cylinder surface, which seals the stepped inlet hole 2*a*. In other words, the saddle-shaped semi-circular surface 5*a* serves as a preliminary seal, and the saddle-shaped semi-cylinder surface 6'*a* serves as a complemental seal to prevent leakage.

The cylindrical elastic seal 6' includes a first bevel 6'*e* and a second bevel 6'*f*. The beveled cylindrical elastic seal 6' is angled on its contacting surface to reduce contacting areas to thereby reduce friction between the contacting surfaces. For example, during assembly process of inserting the cylindrical elastic seal 6' into the metal sealing sleeve 5, the contacting surface with the second bevel 6'*f* is pressed onto the end D of the metal sealing sleeve 5, with smaller contacting area and less friction. It takes longer for the components to wear off, and thus the service life of the assembly is further extended. Further, the pressure is now applied to a smaller area, thereby decreasing the deformation. As such, the saddle seal assembly 4' with the improved cylindrical elastic seal 6' is more durable.

Additionally, the saddle seal assembly 4' includes a metal sleeve insert 7' that is configured to be attached onto the inner surface 6'*g* of the cylindrical elastic seal 6'. Similar to the cylindrical elastic seal 6 of the saddle seal assembly 4, the cylindrical elastic seal 6' can be made of, for example, plastic, nylon, rubber, or any other elastic materials. The airless sprayers spray various fluid through the saddle seal assembly 4' before atomization through the spray tip. The inner surface 6'*g* of the cylindrical elastic seal 6' can be worn off over time by such fluid spray. The metal sleeve insert 7' generally includes a hollow cylinder shape that matches the inner surface 6'*g* of the cylindrical elastic seal 6', and is attached to the inner surface 6'*g* of the cylindrical elastic seal 6' to provide a much harder inner surface than those made of elastic materials. As such, the improved structure can significantly extend the service life of the saddle seal assembly 4'.

The metal sleeve insert 7' can be made of any conventionally processed metal, such as stainless steel, which has a good corrosion resistance and is cost-effective. The metal sleeve insert 7' can be, for example, press fit, seamlessly interference fit, or glued onto the inner surface 6'*g* of the cylindrical elastic seal 6'. The cylindrical elastic seal 6' attached with the metal sleeve insert 7' can be used as one component. A test has shown that the saddle seal assembly 4' has increased the service life to 5 times longer than that of the saddle seal assembly 4 without the attached metal sleeve insert 7'.

Figure 8:
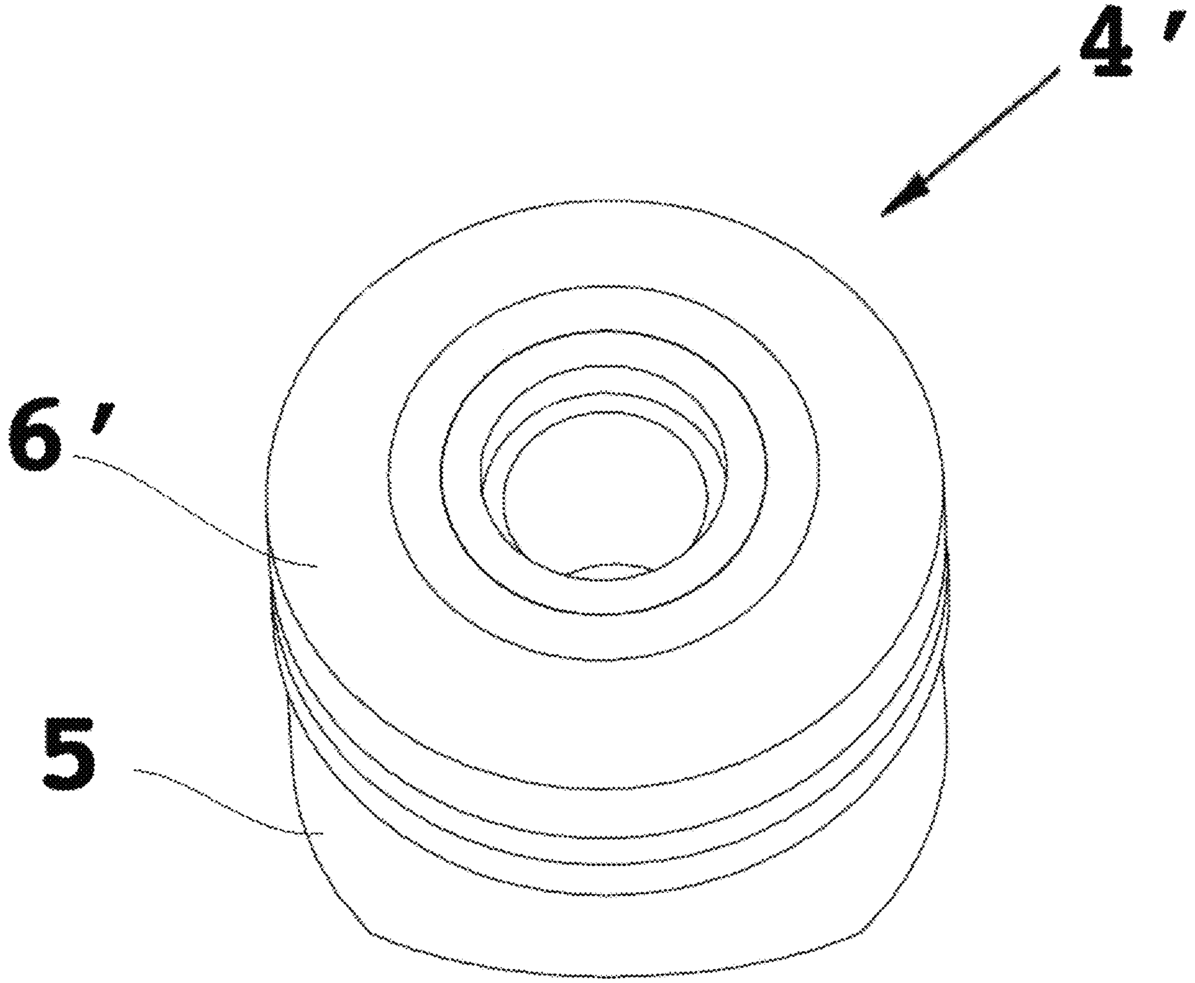
FIG. 8 is a perspective view of the saddle seal assembly of FIGS. 7A-7B.

FIG. 8 shows the saddle seal assembly 4' with the cylindrical elastic seal 6', which has the metal sleeve insert 7' attached, inserted into the metal sealing sleeve 5.

Figure 9B:
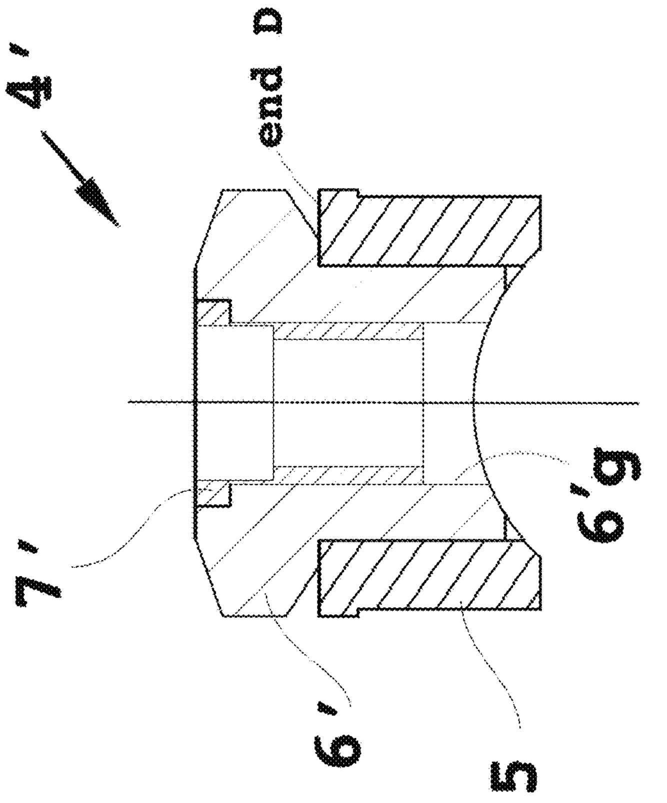
FIGS. 9A and 9B show a cross-sectional view of the example saddle seal assembly of FIG. 7 from a cutting plane.
Figure 9A:
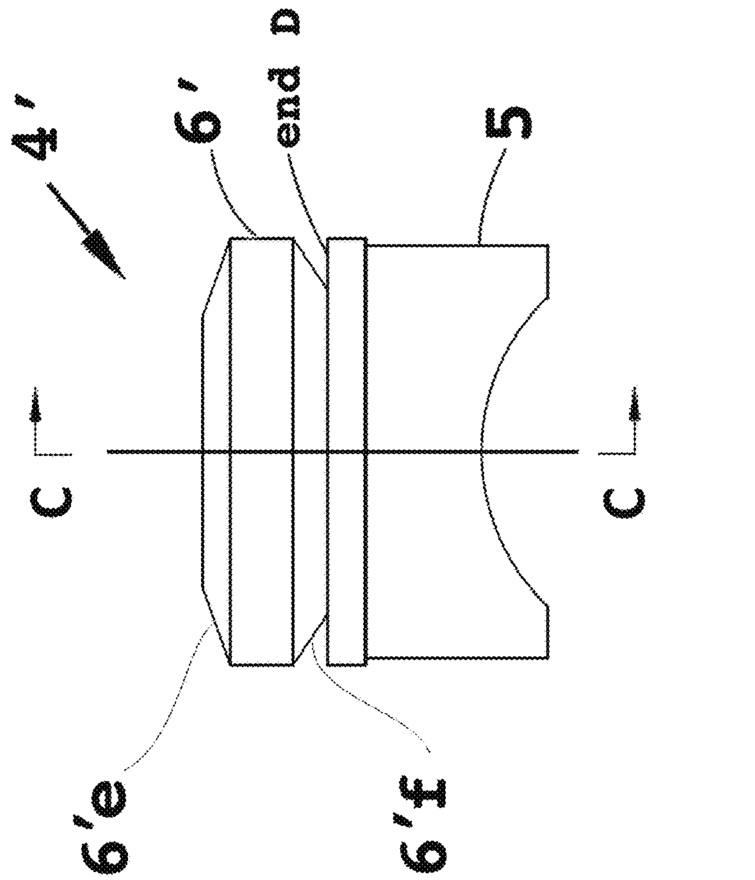

FIG. 9A is a side view of the saddle seal assembly 4' of FIG. 8. As shown in FIG. 9A, the cylindrical elastic seal 6' includes a first bevel 6'*e* and a second bevel 6'*f*. The beveled cylindrical elastic seal 6' is angled on its contacting surface to reduce friction. Specifically, the second bevel 6'*f* is angled on the contacting surface that abuts against the end D of the metal sealing sleeve 5. When the cylindrical elastic seal 6' is inserted into the metal sealing sleeve 5, the contacting area between these two components is significantly reduced. Thus, the friction between the contacting surfaces is reduced. As such, the cylindrical elastic seal 6' with angled bevel 6'*f* further reduces deformation from contacting.

Similar to connecting the spray gun 3 with the saddle seal assembly 4, the connecting end 3*a* of the spray guy 3 also can push the saddle seal assembly 4' into close contact with the spray tip 2. Now that the first bevel 6'*e* is angled on the contacting surface of the cylindrical elastic seal 6' with the spray tip 2, the close contacting area is also reduced with the angled bevel 6'*e*. As such, the friction between the contacting surfaces is reduced during the mounting process when the saddle seal assembly 4' is pressed toward the spray tip 2, to thereby further extend the service life while maintaining the sealing effectiveness.

FIG. 9B further shows a cross-sectional view from a cutting plane C-C of the example saddle seal assembly 4' of FIG. 9A. As shown in FIG. 9B, the metal sleeve insert 7' is attached onto the inner surface 6'*g* of the cylindrical elastic seal 6'.

Figure 10:
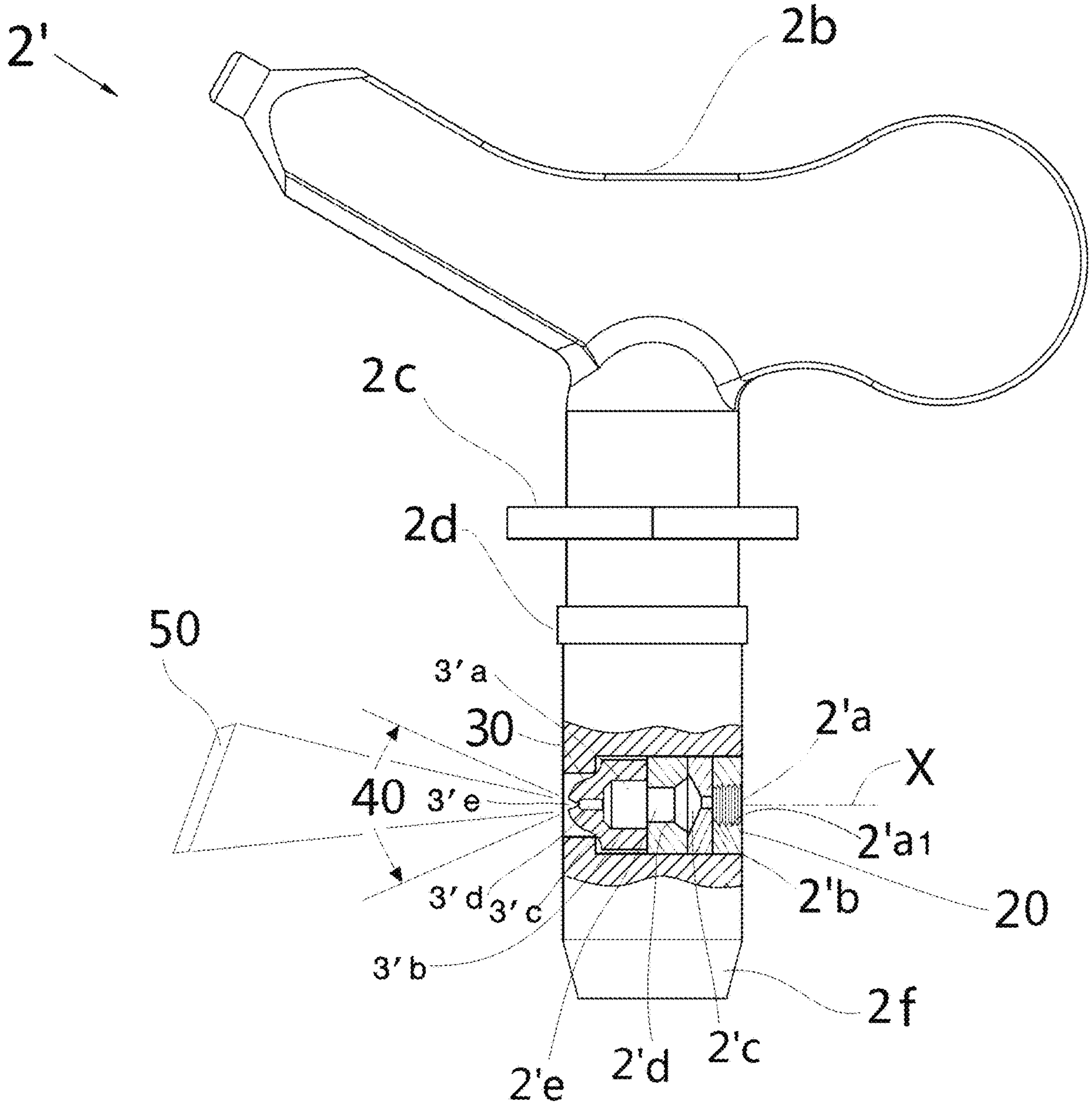
FIG. 10 is a perspective view of another example spray tip according to the principles of the present disclosure.

FIG. 10 shows another example of spray tip 2'. Similar to the spray tip of FIG. 4, the spray tip 2' also includes a cylinder-shaped structure, which has a bevel 2*f* on one end and a handle 2*b* on the other end. The cylinder-shaped structure further includes a retaining shoulder 2*d* and a tip ring collar 2*c* located close to the end connecting with the handle 2*b*.

As shown in FIG. 10, the spray tip 2' further includes a mounting hole 3*b* opened along a channel axis X, a tip atomizing component 30, and a pre-atomizing component 20. The pre-atomizing component 20 and the tip atomizing component 30 are connected to each other sequentially along the channel axis X, in a fluid stream direction.

The tip atomizing component 30 includes a turbulence chamber 3'*a*, an outlet passage 3'*d*, and an outlet orifice 3'*e* that are coaxially defined and sequentially connected along the channel axis X inside the tip atomizing component 30. The turbulence chamber 3'*a* is a cylindrical cavity. Additionally, a frustoconical passage 3'*c* is arranged between the turbulence chamber 3'*a* and the outlet passage 3*e*. The frustoconical passage 3'*c* and the turbulence chamber 3'*a* are coaxial. The outlet passage 3'*e* is a cylindrical passage that extends from the turbulence chamber 3'*a* to the outlet orifice 3'*e*.

Furthermore, as shown in FIG. 10, the pre-atomizing component 20 includes a feeding channel 2'*a*, a pre-atomization channel 2'*b*, and pre-atomization regulating channels 2'*c* and 2'*d* that are coaxial hollow channels sequentially defined and connected along the channel axis X inside the spraying fluid pre-atomizing component 20. The feeding channel 2'*a*, the pre-atomization channel 2'*b*, and the pre-atomization regulating channels 2'*c*, 2'*d*, 2'*e* together may form a hallow structure having passages with changing dimensions.

As shown in FIG. 10, the pre-atomization channel 2'*b* is a narrow cylindrical passage (e.g., the diameter of 2'*b* can be about one fifth of the diameter of the feeding channel 2'*a*); the pre-atomization regulating channels 2'*c* and 2'*d* each have a frustoconical shape; and the pre-atomization regulating channel 2'*e* is a wide cylindrical passage. The diameters of the feeding channel 2'*a*, the pre-atomization channels 2'*b*, the pre-atomization regulating channels 2'*c*, 2'*d*, 2'*e* change from large to small and from small to large along the fluid stream direction. For example, the uniform diameter of the pre-atomization channel 2'*b* and the inlet diameter of the connected pre-atomization regulating channel 2'*c* are both about 0.4 mm-0.8 mm, the outlet diameter of the pre-atomization regulating channel 2'*c* and the inlet diameter of the connected pre-atomization regulating channel 2'*d* are both about 2.0 mm-4.0 mm, the outlet diameter of the pre-atomization regulating channel 2'*d* and the uniform or tapered diameter of the connected pre-atomization regulating channel 2'*e* are both about 1.0 mm-2.5 mm.

As such, the fluid having flown through the feeding channel 2'*a* may be compressed when flowing through the narrow cylindrical pre-atomization channel 2'*b* and its flowing speed is increased. When the fluid flows through the two frustoconical shaped pre-atomization regulating channels 2'*c* and 2'*d*. The outlet of the feeding channel 2'*a* is connected to the small inlet of the frustoconical shaped pre-atomization regulating channel 2'*c*, and the large outlet of the pre-atomization regulating channel 2'*c* is then connected to the large inlet of the frustoconical shaped pre-atomization regulating channel 2'*d*, and the small outlet of the pre-atomization regulating channel 2'*d* is sequentially connected to the wide cylindrical pre-atomization regulating channel 2'*e* with a uniform or a tapered diameter. As such, quickly changing the passage diameter from small to large, the pressure of the fluid can be quickly released and the fluid achieves stabilized pre-atomization. The fluid particles going through the pre-atomizing regulating channels 2'*c* and 2'*d* are violently mixed through the pre-atomization process, forming a turbulent fluid in disordered motions to reduce the net pressure loss of the fluid and refine the fluid particles. The fluid can be further regulated or stabilized when flowing through the wide cylindrical pre-atomization regulating channel 2'*e*.

Accordingly, the spray tip with such structure can operate well at a pressure of 800-3000 psi, which covers at least 50% lower than the normal operating pressure of a airless sprayer in today's market, such as 2000 psi to 3000 psi. The example tip atomizing component 30 can have a spray angle 40 shown in FIG. 10 when operating at the pressure lower than 1000 psi. The quadrilateral strip 50 has an even paint coating quality that results from uniformly applied spraying fluid pattern sign of spraying, as shown in FIG. 13A as well.

In addition, the spray tip that operates well at low pressure can save paint by half, increase the working lifespan by at least 50%, can meanwhile resolve the issue of overspraying. Furthermore, the working fluid particles are appropriately refined through the pre-atomization process, which promotes the uniformity of the spray pattern.

Having pre-atomization channels with small dimension significantly improves compression of working fluids. Manufacturing such parts are normally done by powder pressing (PM) or metal injection molding (MIM).

Alternatively, in some other embodiments of the pre-atomizing component 20, as shown in FIG. 10, the feeding channel 2'*a* further includes a feed turbulence thread 2'*al* on its inner surface.

The fluid enters the feeding channel 2'*a* through an upstream feeding entry. The feeding channel 2'*a* with the feed turbulence thread 2'*al* on its inner surface may increase the disturbance of the fluid to form a vortex that forces the fluid to rotate towards the upstream along the internal surface of the pre-atomization channel 2'*b*. As such, the mass flow rate is increased and the net pressure loss of the fluid is also reduced. Specifically, the fluid is propelled by a swirling force against the internal surface of the internal thread groove of the feed turbulence thread 2'*al* to thereby reducing the mass flow rate and the net pressure loss of the working fluid.

Additionally, the number of turns of the feed turbulent thread 2'*al* can be increased or decreased according to the length of the feeding channel 2'*a*, which is a first-stage turbulent chamber for the fluid flowing downstream. Specifically, the number of turns of the feed turbulent thread 2'*al* may depend on the thread pitch and the relevant specifications that influence the thread turns. For example, smaller number of turns of the feed turbulent thread 2'*al* may be configured for the feeding channel 2'*a* having steeper pitch threads but same length. Bigger number of turns of the feed turbulent thread 2'*al* may be configured for the feeding channel 2'*a* having same pitch threads but greater length.

Figure 11A:
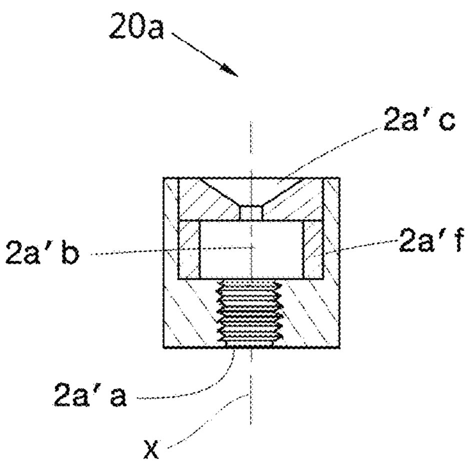
FIGS. 11A, 11B, and 11C show cross-sectional views of example spare pre-atomizing components with various alternative configurations/structures that can replace the pre-atomizing component of FIG. 10.
Figure 11B:
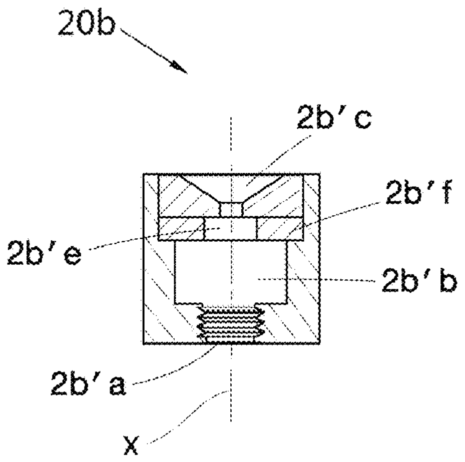
Figure 11C:
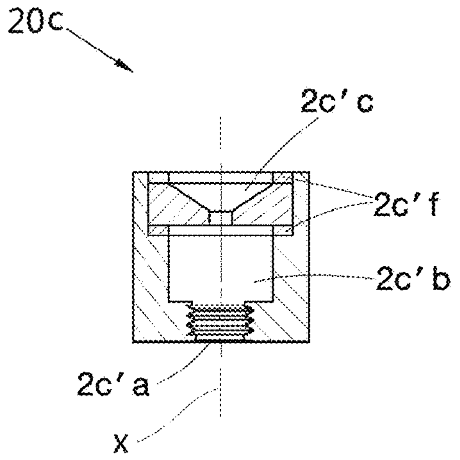

In some alternative embodiments, FIGS. 11A, 11B, and 11C illustrate example spare pre-atomizing components 20*a*, 20*b*, 20*c* with various alternative configurations/structures that can replace the pre-atomizing component 20 of FIG. 10. For example, the pre-atomizing component 20*a* includes a feeding channel 2*a'a*, a pre-atomization regulating channel 2*a'b* and a pre-atomization channel 2*a'c*; the pre-atomizing component 20*b* includes a feeding channel 2*b'a*, a pre-atomization regulating channel 2*b'b*, and two pre-atomization channels 2*b'e* and 2*b'c*; the pre-atomizing component 20*c* includes a feeding channel 2*c'a*, a pre-atomization regulating channel 2*c'b*, and a pre-atomization channel 2*c'c*.

These spare pre-atomizing components are configured to regulate before atomize the fluid. For example, the fluid having flown from the feeding channel 2*a'a* may be regulated/agitated when flowing into the wide pre-atomization regulating channel 2*a'b* and its flowing speed is decreased. The fluid is then compressed when flowing into the frustoconical shaped pre-atomization channels 2*a'c* via its small inlet and out from its large outlet. Such structure is designed for fluid with high consistency as fluid with high consistency can be fully agitated before atomization to decrease pressure loss.

The diameter of the feeding channel 2*a'a* is about 1.5 mm-5 mm. The diameter of the pre-atomization regulating channel 2*a'b* is about 3 mm-5 mm. The small inlet diameter of the pre-atomization channel 2*a'c* is about 0.4 mm-0.8 mm, and the large outlet diameter of the pre-atomization channel 2*a'c* is about 2.0 mm-4.0 mm.

The diameter of the feeding channel 2*b'a* is about 1.5 mm-5 mm. The diameter of the pre-atomization regulating channel 2*b'b* is about 3 mm-5 mm. The diameter of the pre-atomization channel 2*b'e* is about 1 mm-2 mm. The small inlet diameter of the pre-atomization channel 2*a'c* is about 0.4 mm-0.8 mm, and the large outlet diameter of the pre-atomization channel 2*a'c* is about 2.0 mm-4.0 mm.

The diameter of the feeding channel 2*c'a* is about 1.5 mm-5 mm. The diameter of the pre-atomization regulating channel 2*c'b* is about 3 mm-5 mm. The small inlet diameter of the pre-atomization channel 2*c'c* is about 0.4 mm-0.8 mm, and the large outlet diameter of the pre-atomization channel 2*c'c* is about 2.0 mm-4.0 mm.

Additionally, a washer 2*a'f* can be arranged between the feeding channel 2*a'a* and the pre-atomization channel 2*a'c*; a washer 2*b'f* can be arranged between the pre-atomization regulating channel 2*b'b* and the pre-atomization channel 2*b'c*; and two washers 2*c'f* can be arranged at both ends of the pre-atomization channel 2*c'c* for tightly fitted structures. Washers 2*a'f*, 2*b'f*, and 2*c'f* may have various sizes of thickness. Specifically, the two washers 2*c'f* in the pre-atomizing component 20*c* of FIG. 11C play an important role in sealing the pre-atomization channel 2*c'c* from both ends. Such configuration can prevent the pre-atomization channel part 2*c'c* from falling out during the manufacturing/assembling process, therefore reducing the chance of damaging the pre-atomization channel part. As such, the example pre-atomizing component 20*c* with two-end reinforcement sealing structure may be used a lot for mass production.

Figure 12A:
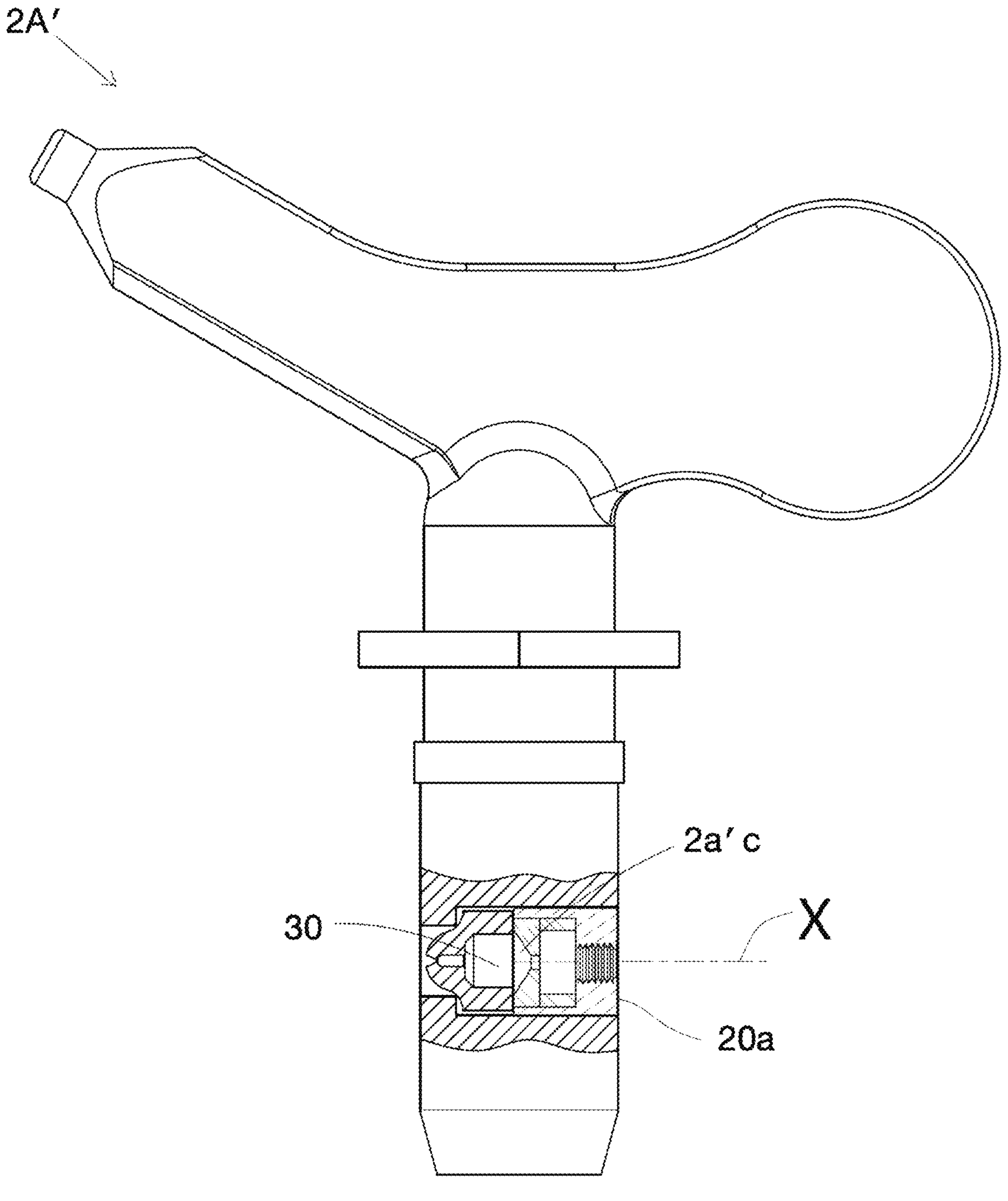
FIG. 12A is a perspective view of another example spray tip similar to the spray tip of FIG. 10 with the pre-atomizing component replaced by the pre-atomizing component of FIG. 11A.

FIG. 12A shows another example spray tip 2A' similar to the spray tip 2' of FIG. 10 with the pre-atomizing component 20 replaced by the pre-atomizing component 20*a* of FIG. 11A. The pre-atomizing component 20*a* is configured to arrange the large outlet of the frustoconical-shaped pre-atomization channel 2*a'c* adjacent the tip atomizing component 30, thus the large outlet of the pre-atomization channel 2*a'c* is close to the spray nozzle exit. Such structure results in a small pressure loss, therefore is suitable for fluid with high consistency.

Figure 12B:
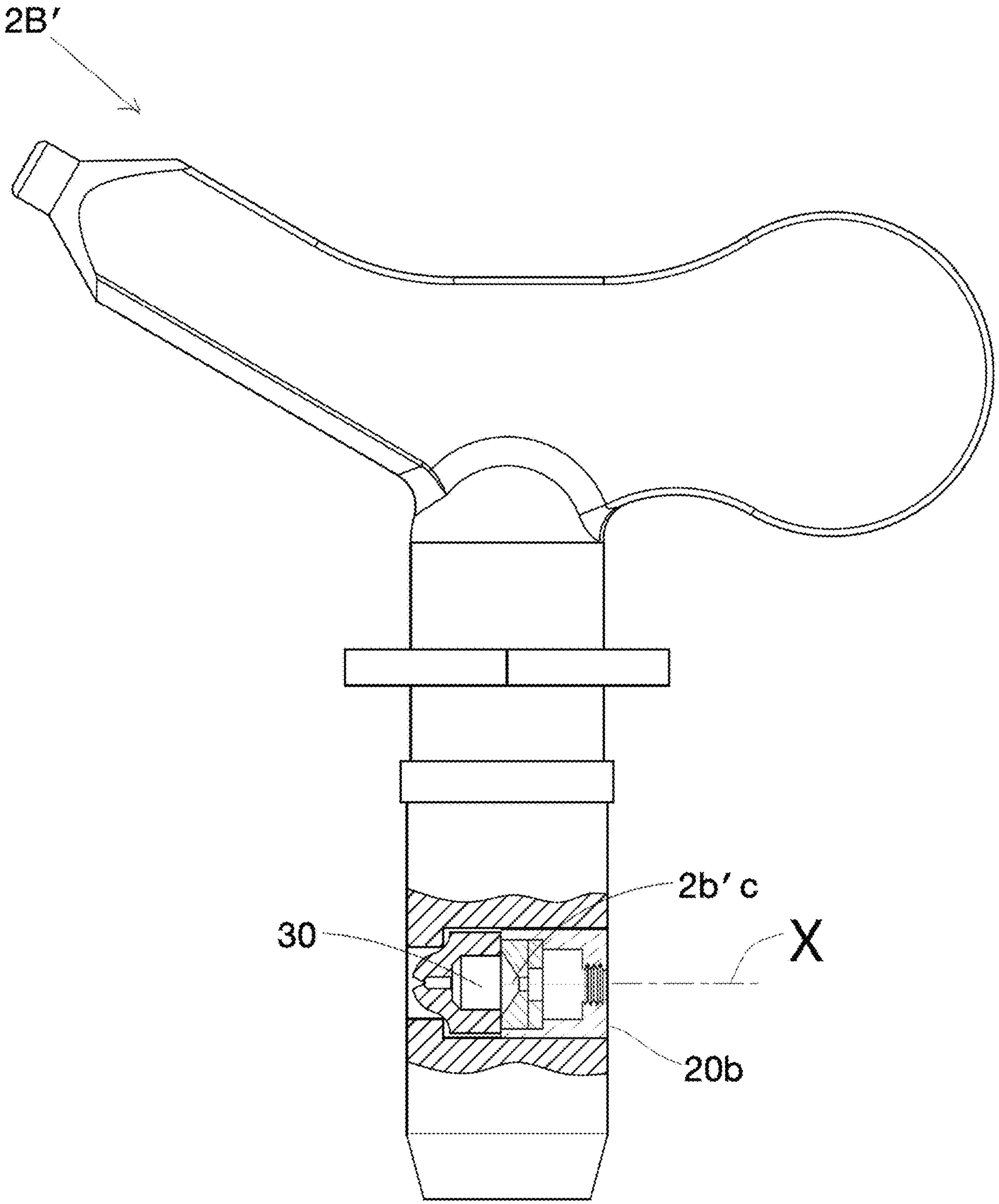
FIG. 12B is a perspective view of another example spray tip similar to the spray tip of FIG. 10 with the pre-atomizing component replaced by the pre-atomizing component of FIG. 11B.
Figure 12C:
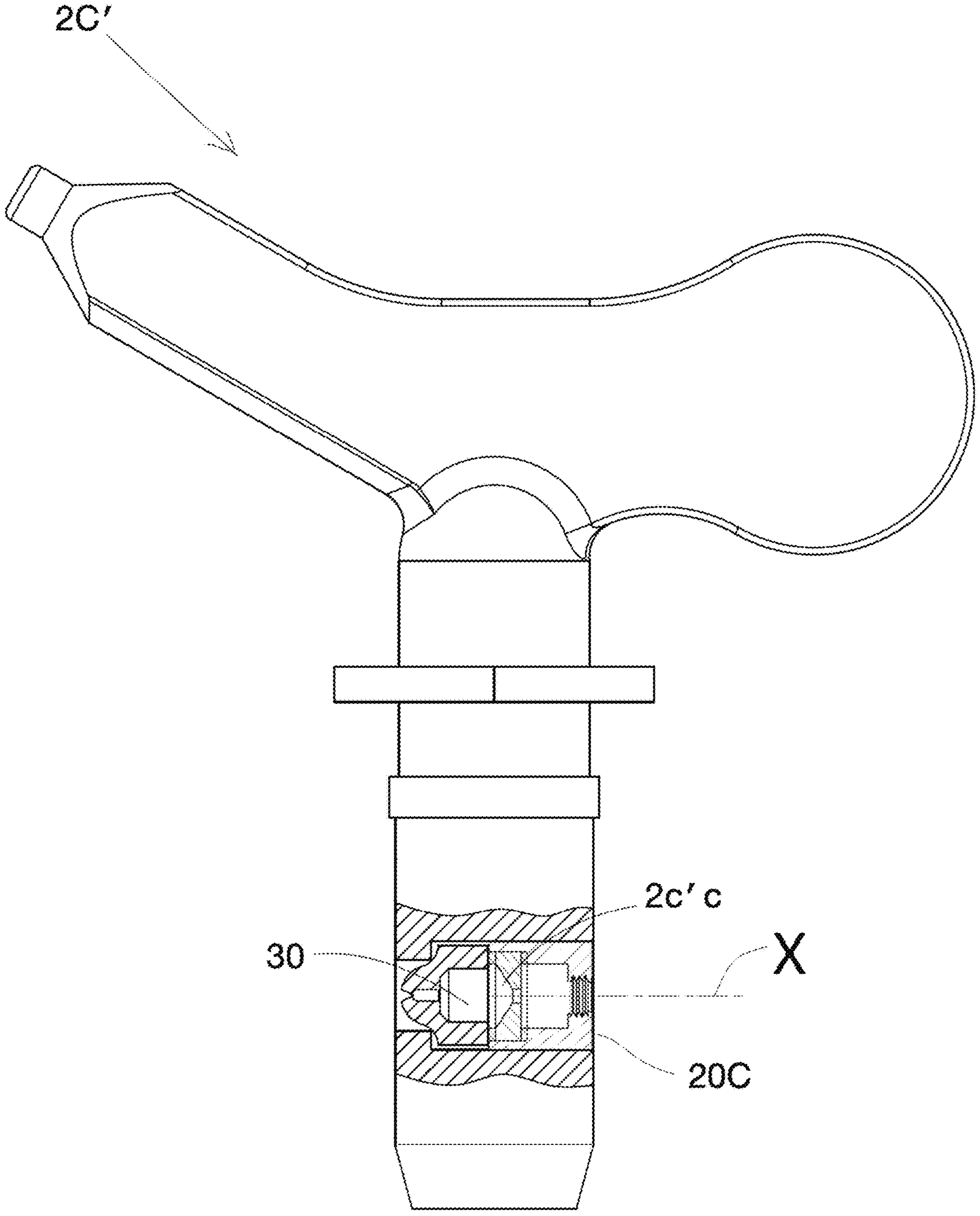
FIG. 12C is a perspective view of another example spray tip similar to the spray tip of FIG. 10 with the pre-atomizing component replaced by the pre-atomizing component of FIG. 11C.

FIGS. 12B and 12 C illustrate example spray tips 2B' and 2C' similar to the spray tip 2A' of FIG. 12A with the pre-atomizing component 20*a* respectively replaced by the pre-atomizing component 20*b* of FIG. 12B and the pre-atomizing component 20*c* of FIG. 12C. Similarly, the pre-atomizing components 20*b* and 20*c* are both configured to respectively arrange the large outlet of the frustoconical-shaped pre-atomization channel 2*b'c* and the large outlet of the frustoconical-shaped pre-atomization channel 2*c'c* adjacent the tip atomizing component 30, thus the large outlet of the pre-atomization channels 2*b'c* and 2*c'c* are close to the spray nozzle exit. Such structure results in a small pressure loss, therefore is also suitable for fluid with high consistency.

Similar to the example spray tip 2' of FIG. 10, the present disclosed alternative spray tips 2A', 2B', and 2C' also provide the following advantages:

Firstly, whether spraying with an electric spray gun or an airless sprayer, the spraying equipment can diffuse the spray pattern uniformly during high and low pressure spraying, thereby applying the spray fluid uniformly to the surface of the workpiece and eliminating the streaks of spray fluid deposits formed at or near the edges, which greatly improves the coating quality.

Secondly, the use of spraying equipment can also significantly extend the lifespan of the sprayer. The higher the pressure, the greater the friction, and the lower the service life, and vice versa. For example, when the high-pressure airless sprayer uses the current inventive spray tip, the working pressure can be reduced by at least one-half compared to the use of conventional high-pressure spray tips, therefore, the service life of the sprayer can be almost doubled. It also solves the problem of overspray of the spray fluid.

Thirdly, the spray pattern of the spray tip of the current invention has the characteristics of high density in the middle and uniform dilution on both edges. As such, during continuous spraying, two adjacent thin edges are overlapped to form substantially the same density as the middle portion, which greatly reduces the difficulty of splicing adjacent painting areas, and therefore improves the aesthetics of the coating.

Lastly, the current invention realizes a secondary atomization by improving the internal flow channels, so that the particles of the sprayed fluid after atomization are further refined than the conventional low-pressure and high-pressure spray tips, which further improves the aesthetics of the coating.

The above spray tip design, whether spraying with an electric spray gun or an airless sprayer, with spraying pressure at a wide range of 800-3000 psi can diffuse the spray pattern uniformly during a wide range pressure spraying. Accordingly, the disclosed example spraying equipment can apply the spray fluid uniformly to the surface of the workpiece, eliminate the streaks of spray fluid deposits formed at or near the edges, and greatly improves the coating quality. FIG. 13A shows the improved distribution of the paint 50 with an even coating quality that results from uniformly applied spraying fluid. However, the spray pattern 70 of FIG. 13B using a prior art pressure spraying equipment includes overspraying edge line 7*a*. This can result in uneven spraying as a whole when transferring or stitching multiple spraying paintings.

In addition, the present spray tip design can substantially extend the lifespan of the sprayer. The higher operating pressure usually wears down the spray tip faster. For example, the presented disclosed spray tip can operate well at a pressure of 1000 psi and lower, which is at least 50% lower than the normal operating pressure of a high-pressure airless sprayer in today's market, such as 2000 psi to 3000 psi. As such, the spray tip according to the present disclosure can increase the working lifespan by at least 50%, can meanwhile resolve the issue of overspraying.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An airless spraying equipment comprising:
a spray tip guard;
a spray tip configured to be inserted into the spray tip guard perpendicularly to the axis of the spray tip guard;
a handle arranged on one end of the spray tip;
a bevel arranged on an other end of the spray tip;
a retaining shoulder;
a ring collar;
a mounting hole having a channel axis;
a pre-atomizing component; and
a tip atomizing component,
wherein the pre-atomizing component and the tip atomizing component are connected to each other sequentially along the channel axis, in a fluid stream direction,
wherein the pre-atomizing component further includes:
a feeding channel,
a pre-atomization channel, and
at least two pre-atomization regulating channels, and
wherein the feeding channel, the pre-atomization channel, and the at least two pre-atomization regulating channels are coaxial hollow channels sequentially defined and connected along the channel axis inside the pre-atomizing component; and
a saddle seal assembly configured to be inserted into the spray tip guard along the axis of the spray tip guard,
wherein the saddle seal assembly includes:
a metal sealing sleeve including a first saddle-shaped semi-cylinder surface matching with an outer surface of the spray tip to form an outer hard sealing structure;
a cylindrical elastic seal including a second saddle-shaped semi-cylinder surface matching with the outer surface of the spray tip to form an inner flexible sealing structure; and
a metal sleeve insert includes a hollow cylinder shape that matches an inner surface of the cylindrical elastic seal,
wherein a first end portion of the cylindrical elastic seal is configured to be inserted into the metal sealing sleeve,
wherein the first saddle-shaped semi-cylinder surface and the second saddle-shaped semi-cylinder surface are configured to be spliced to form a continuous saddle-shaped semi-cylinder surface, to thereby seal a stepped inlet hole of the airless spraying equipment, wherein the metal sleeve insert is attached onto the inner surface of the cylindrical elastic seal, wherein the tip atomizing component further comprises a turbulence chamber, an outlet passage, and an outlet orifice, wherein the turbulence chamber, the outlet passage, and the outlet orifice are coaxially defined and sequentially connected along the channel axis inside the tip atomizing component, wherein the turbulence chamber is a cylindrical cavity, wherein a frustoconical passage is arranged between the turbulence chamber and the outlet passage, wherein the frustoconical passage and the turbulence chamber are coaxial, and the outlet passage is a cylindrical passage that extends from the turbulence chamber to the outlet orifice, wherein the feeding channel, the pre-atomization channel, and the at least two pre-atomization regulating channels form a cylinder-shaped hollow structure having passages with changing dimensions, wherein the pre-atomization channel is a cylindrical passage having a diameter of about 0.4 mm-0.8 mm, and wherein the at least two pre-atomization regulating channels further includes: a first pre-atomization regulating channel and a second pre-atomization regulating channel each having a frustoconical shape, and wherein a wide outlet of the first pre-atomization regulating channel is arranged to be connected to a wide outlet of the second pre-atomization regulating channel.

2. The airless spraying equipment of claim 1, wherein the at least two pre-atomization regulating channels further includes a third pre-atomization regulating channel.

3. The airless spraying equipment of claim 2, wherein the third pre-atomization regulating channel is a cylindrical passage having a diameter of about 1.0 mm-2.5 mm.

4. An airless spraying equipment comprising:

a spray tip guard;

a spray tip configured to be inserted into the spray tip guard perpendicularly to the axis of the spray tip guard;

a handle arranged on one end of the spray tip;

a bevel arranged on an other end of the spray tip;

a retaining shoulder;

a ring collar;

a mounting hole having a channel axis;

a pre-atomizing component; and a tip atomizing component, wherein the pre-atomizing component and the tip atomizing component are connected to each other sequentially along the channel axis, in a fluid stream direction, wherein the pre-atomizing component further includes:

a feeding channel, a pre-atomization regulating channel, and at least one pre-atomization channel, and wherein the feeding channel, the pre-atomization regulating channel, and the at least one pre-atomization channel are coaxial hollow channels sequentially defined and connected along the channel axis inside the pre-atomizing component; and a saddle seal assembly configured to be inserted into the spray tip guard along the axis of the spray tip guard, wherein the saddle seal assembly includes:

a metal sealing sleeve including a first saddle-shaped semi-cylinder surface matching with an outer surface of the spray tip to form an outer hard sealing structure;

a cylindrical elastic seal including a second saddle-shaped semi-cylinder surface matching with the outer surface of the spray tip to form an inner flexible sealing structure; and a metal sleeve insert includes a hollow cylinder shape that matches an inner surface of the cylindrical elastic seal, wherein a first end portion of the cylindrical elastic seal is configured to be inserted into the metal sealing sleeve, wherein the first saddle-shaped semi-cylinder surface and the second saddle-shaped semi-cylinder surface are configured to be spliced to form a continuous saddle-shaped semi-cylinder surface, to thereby seal a stepped inlet hole of the airless spraying equipment, wherein the metal sleeve insert is attached onto the inner surface of the cylindrical elastic seal, wherein the feeding channel, the pre-atomization regulating channel, and the at least one pre-atomization channel form a cylinder-shaped hollow structure having passages with changing dimensions, and wherein the at least one pre-atomization channel further is frustoconical-shape, and wherein a large outlet of the at least one pre-atomization channel is arranged to be adjacent the tip atomizing component.

5. The airless spraying equipment of claim 4, wherein the pre-atomization regulating channel is a cylindrical passage having a diameter of about 3 mm-5 mm.

6. The airless spraying equipment of claim 4, wherein the at least one pre-atomization channel further includes a first pre-atomization channel and a second pre-atomization channel.

7. The airless spraying equipment of claim 6, wherein the first pre-atomization channel is a cylindrical passage having a diameter of about 1 mm-2 mm and the second pre-atomization channel is frustoconical-shape, and wherein a large outlet of the second pre-atomization channel is arranged to be adjacent the tip atomizing component.

* * * * *